US012654445B2

(12) United States Patent
Fujii et al.

(10) Patent No.: US 12,654,445 B2
(45) Date of Patent: Jun. 16, 2026

(54) SINGLE CRYSTAL SILICON SUBSTRATE, LIQUID DISCHARGE HEAD, AND METHOD FOR MANUFACTURING SINGLE CRYSTAL SILICON SUBSTRATE

(71) Applicant: SEIKO EPSON CORPORATION, Tokyo (JP)

(72) Inventors: Masahiro Fujii, Shiojiri (JP); Koji Kitahara, Ina (JP); Noboru Furuya, Chino (JP); Motoki Takabe, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 91 days.

(21) Appl. No.: 18/316,252

(22) Filed: May 12, 2023

(65) Prior Publication Data

US 2023/0364907 A1 Nov. 16, 2023

(30) Foreign Application Priority Data

May 12, 2022 (JP) ................................ 2022-078679

(51) Int. Cl.
*B41J 2/14* (2006.01)
*B41J 2/16* (2006.01)

(52) U.S. Cl.
CPC .......... *B41J 2/14201* (2013.01); *B41J 2/161* (2013.01); *B41J 2/1626* (2013.01); *B41J 2/1643* (2013.01)

(58) Field of Classification Search
CPC ...... B41J 2/14201; B41J 2/161; B41J 2/1626; B41J 2/1643; B41J 2/1623; B41J 2/1634; B41J 2/1635; B41J 2/1642; B41J 2002/14241; B41J 2002/14491; B41J 2202/11; B41J 2202/12; B41J 2/14233; B41J 2/145; B41J 2/1628; B41J 2/1629;
(Continued)

(56) References Cited

U.S. PATENT DOCUMENTS 7,784,913 B2 8/2010 Yoda
8,839,520 B2 9/2014 Yoda
(Continued)

FOREIGN PATENT DOCUMENTS

CN 112078248 A 12/2020
JP 2004188939 A * 7/2004
(Continued)

OTHER PUBLICATIONS

Furuhata Yutaka, Manufacturing Method for Liquid Jet Head (JP-2004188939 A), Jul. 8, 2004, [Paragraphs 0034-0049] (Year: 2004).*
(Continued)

*Primary Examiner* — Lisa Solomon
(74) *Attorney, Agent, or Firm* — CHIP LAW GROUP

(57) ABSTRACT

A single crystal silicon substrate at least a part of which constitutes a flow path for liquid includes a first through-hole including an inclined side wall inclined with respect to a substrate surface of the single crystal silicon substrate, and a second through-hole constituting the flow path and including a side wall constituted by a vertical side wall more nearly vertical to the substrate surface than the inclined side wall is. The first through-hole is formed by crystal anisotropic etching. The second through-hole is formed by metal-assisted chemical etching.

1 Claim, 9 Drawing Sheets

(58) Field of Classification Search
CPC . B41J 2/1631; B41J 2/14; B41J 2/1433; B41J 2/162; B41J 2/164
See application file for complete search history.

(56) References Cited

U.S. PATENT DOCUMENTS

| | | | |
|---|---|---|---|
| 2006/0164468 | A1 | 7/2006 | Yoda |
| 2006/0234534 | A1 | 10/2006 | Sato |
| 2008/0090074 | A1 | 4/2008 | Matsumura et al. |
| 2010/0291715 | A1 | 11/2010 | Yoda |
| 2016/0208404 | A1 | 7/2016 | Sadik et al. |
| 2017/0106653 | A1 | 4/2017 | Matsumoto et al. |
| 2020/0395528 | A1 | 12/2020 | Fujii et al. |

FOREIGN PATENT DOCUMENTS

| | | | | |
|---|---|---|---|---|
| JP | 2006281763 | A | 10/2006 | |
| JP | 2006289943 | A | 10/2006 | |
| JP | 2007062035 | A | 3/2007 | |
| JP | 2007066965 | A | 3/2007 | |
| JP | 2011025462 | A | 2/2011 | |
| JP | 4807754 | B2 | 11/2011 | |
| JP | 5322173 | B2 | 10/2013 | |
| JP | 2017201660 | A | 11/2017 | |
| JP | 6582859 | B2 | 10/2019 | |
| JP | 2020199748 | A | 12/2020 | |
| WO | WO-9827588 | A1 * | 6/1998 | ............ H05K 3/403 |
| WO | 2006051727 | A1 | 5/2006 | |

OTHER PUBLICATIONS

Hesselbom et al., "A Via Structure", Jun. 25, 1998, [Summary] (Year: 1998).*

Office Action for CN Patent Application No. 202310524324.4, issued on Jun. 12, 2025, 12 pages.

Office Action for JP Patent Application No. 2022078679, issued on Mar. 3, 2026, 8 pages.

* cited by examiner

SINGLE CRYSTAL SILICON SUBSTRATE, LIQUID DISCHARGE HEAD, AND METHOD FOR MANUFACTURING SINGLE CRYSTAL SILICON SUBSTRATE

BACKGROUND

1. Technical Field

The present disclosure relates to a single crystal silicon substrate, a liquid discharge head, and a method for manufacturing a single crystal silicon substrate.

2. Related Art

In the past, various silicon substrates have been used. Such silicon substrates are desirably used in various liquid discharge heads such as an ink-jet head that discharges ink as liquid. As a liquid discharge head including such a silicon substrate, for example, JP-A-2007-62035 discloses a liquid droplet discharge head including a flow path substrate and a sealing substrate that can be formed of silicon or the like.

The liquid discharge head is desirably small and has a high resolution. Here, in the liquid droplet discharge head of JP-A-2007-62035, a reservoir forming substrate that is the sealing substrate is provided with a first opening portion as a through-hole at which a wiring line electrically coupled to a piezoelectric element is arranged, and a through-hole that is an ink reservoir. Here, both the first opening portion and the ink reservoir are formed by anisotropic etching using potassium hydroxide as an etching solution. When a through-hole is formed by such a method, a side surface of the through-hole forms an inclined surface with respect to a substrate surface. Therefore, it can be said that a side surface of the first opening portion as a first through-hole clearly forms an inclined surface with respect to a substrate surface of the reservoir forming substrate as illustrated in a drawing, and a side surface of the ink reservoir as a second through-hole also forms an inclined surface with respect to the substrate surface of the reservoir forming substrate. However, when both the first through-hole and the second through-hole are configured such that the side surfaces form the inclined surfaces, the substrate surface needs to be widely configured, and there is a possibility that the liquid discharge head becomes large and a pitch between nozzles is increased to lower a resolution.

SUMMARY

Thus, a single crystal silicon substrate according to the present disclosure for resolving the above problem is a single crystal silicon substrate at least a part of which constitutes a flow path for liquid, the single crystal silicon substrate including a first through-hole including an inclined side wall inclined with respect to a substrate surface of the single crystal silicon substrate, and a second through-hole constituting the flow path and including a side wall constituted by a vertical side wall more nearly vertical to the substrate surface than the inclined side wall is, wherein the first through-hole is formed by crystal anisotropic etching, and the second through-hole is formed by metal-assisted chemical etching.

Additionally, a method for manufacturing a single crystal silicon substrate according to the present disclosure for resolving the above problem includes subjecting a first etching target region of a first surface of a substrate surface of a single crystal silicon substrate to crystal anisotropic etching to form a first through-hole including an inclined side wall inclined with respect to the substrate surface, forming a catalyst film in a second etching target region of a second surface of the substrate surface of the single crystal silicon substrate, the second surface being opposite to the first surface, and bringing the single crystal silicon substrate with the catalyst film formed into contact with an etching solution to etch the second etching target region to form a second through-hole, the second through-hole including a side wall constituted by a vertical side wall more nearly vertical to the second surface than the inclined side wall is.

DESCRIPTION OF EXEMPLARY EMBODIMENTS

Figure 1:
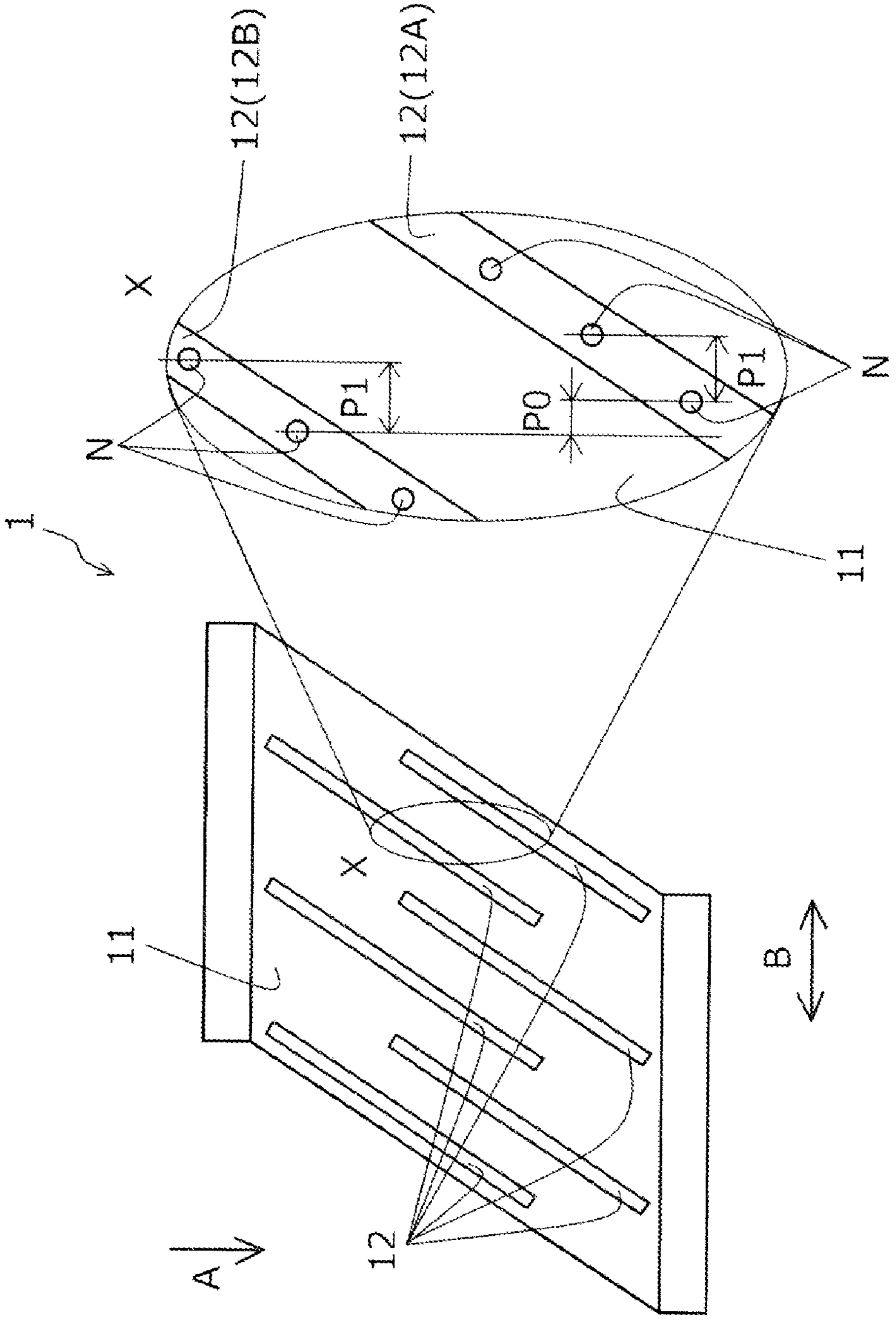
FIG. 1 is a bottom view of a liquid discharge head of Example 1 of the present disclosure and an enlarged view of a partial region X thereof.

First, the present disclosure will be schematically described.

A single crystal silicon substrate according to a first aspect of the present disclosure for resolving the above problem is a single crystal silicon substrate at least a part of which constitutes a flow path for liquid, the single crystal silicon substrate including a first through-hole including an inclined side wall inclined with respect to a substrate surface of the single crystal silicon substrate, and a second through-hole constituting the flow path and including a side wall constituted by a vertical side wall more nearly vertical to the substrate surface than the inclined side wall is, wherein the first through-hole is formed by crystal anisotropic etching, and the second through-hole is formed by metal-assisted chemical etching.

According to the present aspect, the first through-hole is formed by crystal anisotropic etching, and the second through-hole is formed by metal-assisted chemical etching. By forming a through-hole by metal-assisted chemical etching, the through-hole can include a side wall more nearly vertical than in a case of forming a through-hole by crystal anisotropic etching. Therefore, the side wall of the second through-hole can be constituted by the vertical side wall substantially vertical to the substrate surface. Therefore, a single crystal silicon substrate having elaborate structure can be manufactured, and a liquid discharge head that is small and has a high resolution can be manufactured.

A single crystal silicon substrate according to a second aspect of the present disclosure is the single crystal silicon substrate according to the first aspect, further including, as the substrate surfaces, a first surface on a side where the inclined side wall is exposed, and a second surface opposite to the first surface, wherein the first through-hole and the second through-hole extend from the first surface to the second surface, and an opening portion of the second through-hole on the first surface side is provided with an inclined surface with respect to the first surface, the inclined surface widening toward the first surface.

According to the present aspect, the opening portion of the second through-hole on the first surface side is provided with the inclined surface with respect to the first surface that widens toward the first surface. Thus, it is possible to prevent or restrict burrs and the like from remaining in the opening portion. In addition, with such an opening portion, for example, when liquid is poured into the second through-hole from the opening portion, the liquid can be suitably poured.

A liquid discharge head according to a third aspect of the present disclosure includes the first or second single crystal silicon substrate, and a cavity substrate including a third surface at which a piezoelectric element and a conductive portion electrically coupled to the piezoelectric element are formed, and a fourth surface at least a part of which constitutes the flow path and that is opposite to the third surface, wherein the third surface is bonded to the substrate surface with a part of the conductive portion exposed through the first through-hole, and the flow path of the fourth surface communicates with the second through-hole.

According to the present aspect, the third surface is bonded to the substrate surface by the above single crystal silicon substrate and the cavity substrate with a part of the conductive portion exposed through the first through-hole, and the flow path of the fourth surface communicates with the second through-hole. Thus, it is possible to manufacture a liquid discharge head that is small and has a high resolution.

A method for manufacturing a single crystal silicon substrate according to a fourth aspect of the present disclosure includes subjecting a first etching target region of a first surface of a substrate surface of a single crystal silicon substrate to crystal anisotropic etching to form a first through-hole including an inclined side wall inclined with respect to the substrate surface, forming a catalyst film in a second etching target region of a second surface of the substrate surface, the second surface being opposite to the first surface, and bringing the single crystal silicon substrate with the catalyst film formed into contact with an etching solution to etch the second etching target region to form a second through-hole, the second through-hole including a side wall constituted by a vertical side wall more nearly vertical to the second surface than the inclined side wall is.

According to the present aspect, the first etching target region is subjected to crystal anisotropic etching to form the first through-hole including the inclined side wall, and the second etching target region with the catalyst film formed is etched to form the second through-hole including the side wall constituted by the vertical side wall. By forming a through-hole using a catalyst film as in metal-assisted chemical etching, it is possible to form a through-hole including a side wall more nearly vertical than when a through-hole is formed by crystal anisotropic etching. Therefore, the side wall of the second through-hole can be constituted by the vertical side wall substantially vertical to the substrate surface. Therefore, a single crystal silicon substrate having elaborate structure can be manufactured, and a liquid discharge head that is small and has a high resolution can be manufactured.

A method for manufacturing a single crystal silicon substrate according to a fifth aspect of the present disclosure is the method according to the fourth aspect, wherein while forming the first through-hole, an alkaline aqueous solution is used as the etching solution, and while forming the second through-hole, the second through-hole is formed by metal-assisted chemical etching.

According to the present aspect, while forming the first through-hole, an alkaline aqueous solution is used as an etching solution, and while forming the second through-hole, the second through-hole is formed by metal-assisted chemical etching. By manufacturing a single crystal silicon substrate in this manner, the single crystal silicon substrate can be manufactured easily and with high accuracy.

A method for manufacturing a single crystal silicon substrate according to a sixth aspect of the present disclosure is the method according to the fifth aspect, wherein while forming the catalyst film, the catalyst film is formed by an electroless plating method or a vapor deposition method.

According to the present aspect, the catalyst film is formed by an electroless plating method or a vapor deposition method. By manufacturing a single crystal silicon substrate in this manner, the single crystal silicon substrate can be manufactured particularly easily and with high accuracy.

A method for manufacturing a single crystal silicon substrate according to a seventh aspect of the present disclosure is the method according to any one of the fourth to sixth aspects, wherein while forming the second through-hole, the second through-hole is caused to extend from the second surface to the first surface, and forming the second through-hole includes providing an opening portion of the second through-hole on the first surface side with an inclined surface with respect to the first surface, the inclined surface widening toward the first surface.

According to the present aspect, the second through-hole is caused to extend from the second surface to the first surface, and the opening portion of the second through-hole on the first surface side is provided with the inclined surface with respect to the first surface that widens toward the first surface. Thus, it is possible to prevent or restrict burrs and the like from remaining in the opening portion. In addition, with such an opening portion, for example, when liquid is poured into the second through-hole from the opening portion, the liquid can be suitably poured.

Example 1

Next, a liquid discharge head 1 of Example 1 of the present disclosure will be described in detail with reference to FIG. 1 to FIG. 4. Note that, in the following figures, in order to facilitate understanding of structure of the liquid discharge head 1, some members are simplified, some members are omitted, and an aspect ratio of some members is changed.

FIG. 1 illustrating the liquid discharge head 1 of the present example is a bottom view of an ink-jet head capable of forming an image by discharging ink as liquid from nozzles N onto a medium, while transporting the medium in a moving direction A, or while the liquid discharge head 1 itself is moving in the moving direction A with respect to the stopped medium. The liquid discharge head 1 of the present example is a so-called line head in which the nozzles N are provided corresponding to the entire medium in a width direction B intersecting the moving direction A.

When the plurality of nozzles N are arranged at a nozzle forming surface 11 that is a bottom surface of the line head, the nozzles N can be arranged most simply by arranging the nozzles N in the width direction B. However, when the nozzles N are arranged in such a manner, a pitch between the nozzles N adjacent in the width direction B is widened. When the pitch between the adjacent nozzles N is widened, a resolution is lowered. Therefore, in the liquid discharge head 1 of the present example, a plurality of nozzle rows 12 in which the nozzles N are aligned in straight lines are arranged so as to be inclined with respect to the moving direction A.

As illustrated in an enlarged view of the region X in FIG. 1, in the liquid discharge head 1 of the present example, an interval between the nozzles N in the width direction B of each nozzle row 12 is a pitch P1. Further, since the adjacent nozzle rows 12 are configured to discharge the same ink, and a configuration is adopted in which positions of the nozzles N are shifted by half the pitch P1 for each nozzle row 12 between the nozzle rows 12 adjacent to each other in the width direction B, an interval between the nozzles N in the width direction B of the liquid discharge head 1 is a pitch P0, which is half the pitch P1. In the liquid discharge head 1 of the present example, by arranging the nozzle rows 12 as described above, the resolution is increased to 1200 dpi (dot per inch) with the pitch of P0.

Figure 2:
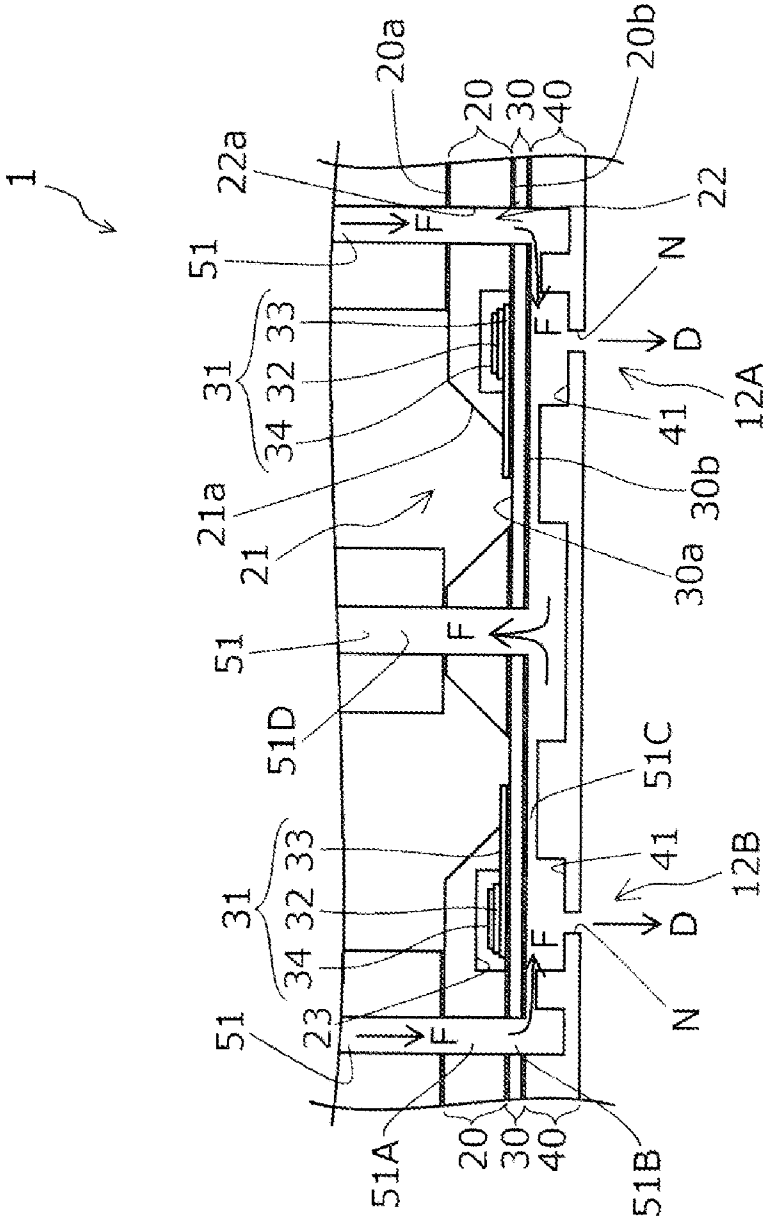
FIG. 2 is a side cross-sectional view of the liquid discharge head of FIG. 1.

Note that, in addition to arranging the nozzle rows 12 so as to be inclined with respect to the moving direction A as described above, the interval between the adjacent nozzles N is narrowed, and thus it is possible to further increase the resolution. The liquid discharge head 1 of the present example is configured as illustrated in FIG. 2 to narrow the interval between the adjacent nozzles N. FIG. 2 is a cross-sectional view taken in a direction generally along the moving direction A. In the liquid discharge head 1 of the present example, the same ink is supplied from an ink cartridge (not illustrated) to both a nozzle row 12A and a nozzle row 12B of the nozzle rows 12, and the same ink can be discharged from the nozzles N of the nozzle row 12A and the nozzles N of the nozzle row 12B. Further, the liquid discharge head 1 of the present example has a configuration in which the ink can be circulated and used, and the ink flows in a flow direction F inside the liquid discharge head 1. Specifically, in both the nozzle row 12A and the nozzle row 12B, the ink flowing from the ink cartridge in the flow direction F returns to a circulating flow path 51D, via a flow path 51A corresponding to a second through-hole 22 of a sealing plate 20 described later, a flow path 51B corresponding to a through-hole of a cavity substrate 30 described later, and a flow path 51C constituted by the cavity substrate 30 and a flow path substrate 40 described later, each of which forms a part of a flow path 51. In this way, by making the circulating flow path 51D common to the two nozzle rows 12, an interval between the adjacent nozzle rows 12 is narrowed. Note that, the ink returning to the circulating flow path 51D flows through the flow path 51 again in the flow direction F and is reused.

Figure 3:
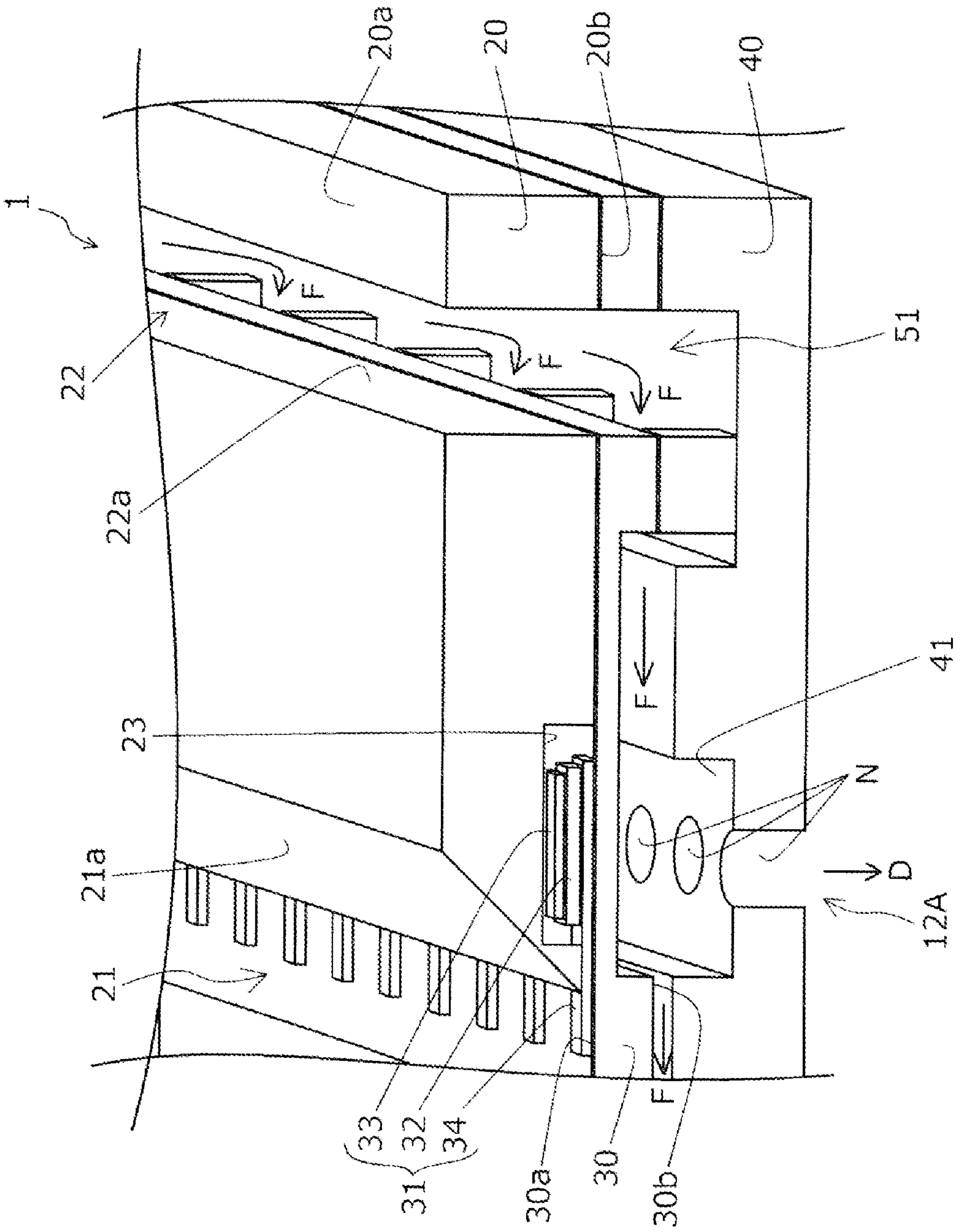
FIG. 3 is a perspective view of the liquid discharge head of FIG. 1.

The detailed configuration of the liquid discharge head 1 of the present example will be further described with reference to FIGS. 2 and 3. FIG. 3 illustrates a part of the liquid discharge head 1 of the present example on the nozzle row 12A side. The liquid discharge head 1 of the present example includes the sealing plate 20, the cavity substrate 30, and the flow path substrate 40.

The sealing plate 20 is a single crystal silicon substrate at least a part of which constitutes the flow path 51 of liquid. In addition, the sealing plate 20 includes a first surface 20*a* and a second surface 20*b* that is a surface opposite to the first surface 20*a* as substrate surfaces, and includes a first through-hole 21 including an inclined side wall 21*a* inclined with respect to the first surface 20*a* and the second surface 20*b*. In addition, the sealing plate 20 includes the second through-hole 22 that constitutes the flow path 51 and that includes a side wall constituted by a vertical side wall 22*a* more nearly vertical to the first surface 20*a* and the second surface 20*b* than the inclined side wall 21*a* is. Then, the second through-hole 22 is a part of the flow path 51, and serves as an ink reservoir. As described above, since the second through-hole 22 including the side wall constituted by the vertical side wall 22*a* that is nearly vertical serve as the ink reservoir, it is possible to prevent or restrict the sealing plate 20 from becoming large in a planar direction in which the substrate surface expands, and it is possible to reduce a size of the liquid discharge head 1.

The cavity substrate 30 includes a third surface 30*a* and a fourth surface 30*b* that is a surface opposite to the third surface 30*a* as substrate surfaces, and is bonded to the sealing plate 20 by the third surface 30*a* being bonded to the second surface 20*b*. Similar to the sealing plate 20, the cavity substrate 30 of the present example is also a single crystal silicon substrate, but is not limited to be the single crystal silicon substrate. Further, a piezoelectric element 32 and electrode films 33 and 34 as conductive portions electrically coupled to the piezoelectric element 32 are formed as an electrode portion 31 at the third surface 30*a*, and at least a part of the fourth surface 30*b* constitutes the flow path 51. Note that, a piezoelectric element accommodation chamber 23 is provided in a region of the sealing plate 20 corresponding to a formation position of the electrode portion 31. The electrode film 33 extends from the piezoelectric element accommodation chamber 23 to the first through-hole 21. From another viewpoint, a tape carrier package (TCP) is chip-on-flex (COF) mounted at the first through-hole 21. In the COF mounting, a dedicated tool is used for thermal compression bonding of the TCP, but by widening the first surface 20*a* side and narrowing the second surface 20*b* side at the time of the COF mounting, it is possible to prevent or restrict the sealing plate 20 or the cavity substrate 30 from becoming large in the planar direction, and it is possible to reduce the size of the liquid discharge head 1.

The flow path substrate 40 is provided with a pressure chamber 41 at a position facing the electrode portion 31 via the cavity substrate 30, and the pressure chamber 41 is provided with the nozzle N that discharges ink in a discharge direction D. The pressure chamber 41 forms a part of the flow path 51 and is coupled to the circulating flow path 51D, so that the ink which cannot be fully discharged from the nozzle N can be caused to flow to the circulating flow path 51D. When the electrode portion 31 is energized, the piezoelectric element 32 is deformed and the cavity substrate 30 vibrates, so that pressure is applied to the pressure chamber 41, and the ink in the pressure chamber 41 is discharged from the nozzle N in the discharge direction D.

Here, in the sealing plate 20 of the present example, the first through-hole 21 is formed by crystal anisotropic etching, and the second through-hole 22 is formed by metal-assisted chemical etching (MACE). By forming a through-hole by MACE, it is possible to form a through-hole including a side wall more nearly vertical than when a through-hole is formed by crystal anisotropic etching.

Therefore, the side wall of the second through-hole 22 can be constituted by the vertical side wall 22*a* substantially vertical to the first surface 20*a* and the second surface 20*b* that are the substrate surfaces. By forming the sealing plate 20 as described above, a single crystal silicon substrate having elaborate structure can be manufactured, and the liquid discharge head 1 that is small and has a high resolution can be manufactured. Further, by forming the first through-hole 21 by crystal anisotropic etching and forming the second through-hole 22 by metal-assisted chemical etching, etching can be performed in an all-wet state, without using dry etching that uses a large amount of greenhouse gases. For this reason, by forming the sealing plate 20 as described above, it is possible to improve productivity, and reduce an amount of electric power and use of greenhouse gases accompanying manufacturing.

Here, an angle formed by the vertical side wall 22*a* with respect to the substrate surface may be 90° plus or minus 2°. This is because by using a single crystal silicon wafer in which Miller indices (indices of crystal plane) of the substrate surface that is a front surface are (100) for the sealing plate 20, and devising composition of an etching solution, it is possible to manage vertical etching by MACE, for example, a thickness of the sealing plate 20 in a range of about 400 μm, and to secure verticality.

Further, an angle formed by the inclined side wall 21*a* with respect to the substrate surface may be from 45.0° to 54.7°. 54.7° is an angle formed by a front surface portion of the first surface 20*a* of the sealing plate 20 having the Miller indices (indices of crystal plane) of (100) and a crystal plane having Miller indices (indices of crystal plane) of (111) where etching progresses the slowest, and is a value of $COS^{-1}$ ($⅓^{1/2}$) in calculation. In addition, 45° is an angle formed by a crystal plane that is stable next and has Miller indices (indices of crystal plane) of (110), and is a value of $COS^{-1}$ ($½^{1/2}$). Note that, as compared with the case where the angle is 45°, an etching surface is more stable when the angle is 54.7°, and an entire size of the sealing plate 20 can be reduced.

In addition, the liquid discharge head 1 of the present example includes the sealing plate 20 that is the single crystal silicon substrate as described above, and the cavity substrate 30 that includes the third surface 30*a* and the fourth surface 30*b* as described above. Then, in the liquid discharge head 1 of the present example, the third surface 30*a* is bonded to the second surface 20*b* that is the substrate surface of the sealing plate 20 with a part of the conductive portion exposed via the first through-hole 21, and the flow path 51 partially constituted by the fourth surface 30*b* communicates with the second through-hole 22. As described above, the liquid discharge head 1 of the present example has the configuration in which the third surface 30*a* is bonded to the substrate surface of the sealing plate 20 by the sealing plate 20 and the cavity substrate 30 described above to expose a part of the conductive portion via the first through-hole 21, and the configuration in which the flow path 51 of the fourth surface 30*b* communicates with the second through-hole 22, and thus has a small size and a high resolution.

Next, a method for manufacturing the sealing plate 20 of the present example will be described with reference to FIGS. 4 and 5. As illustrated in FIG. 5, in the method for manufacturing the sealing plate 20 of the present example, first, an etching preparation step of step S10 is performed. In the etching preparation step of Step S10, first, an oxide film 202 represented by $SiO_2$ is formed at a single crystal silicon substrate 201 illustrated by a top diagram of FIG. 4, as illustrated in a second diagram from the top of FIG. 4. Then, as illustrated in a third diagram from the top of FIG. 4, patterning is performed with a resist 203 by photolithography, an Au film 204 that is a film made of gold serving as a catalyst film of MACE is formed as illustrated in a fourth diagram from the top of FIG. 4, and lift-off formation is performed as illustrated in a fifth diagram from the top of FIG. 4. Note that, in the present example, the Au film 204 is formed by depositing Au on an entire lower surface in the diagram, but the formation of the Au film 204 is not limited to such a method. Here, in the state of the fifth diagram from the top of FIG. 4, the Au film 204 has a disk shape when viewed from the lower surface. Thereafter, as illustrated in a sixth diagram from the top of FIG. 4, the oxide film 202 represented by $SiO_2$ is formed at the entire lower surface in the diagram, patterning is performed with a resist by photolithography, and then the resist is removed by etching as illustrated in a seventh diagram from the top of FIG. 4. Up to this point corresponds to the etching preparation step of the step S10.

Next, a first through-hole forming step in step S20 of FIG. 5 is performed. Specifically, as illustrated in an eighth diagram from the top of FIG. 4, a through-hole corresponding to the first through-hole 21 is formed by crystal anisotropic etching, which is wet etching using potassium hydroxide (KOH). At this time, a concave portion corresponding to the piezoelectric element accommodation chamber 23 is also formed. Note that, since the concave portion corresponding to the piezoelectric element accommodation chamber 23 is shallower than the through-hole corresponding to the first through-hole 21, the oxide film 202 represented by $SiO_2$ may be thinly left in a region corresponding to the concave portion corresponding to the piezoelectric element accommodation chamber 23, for example, in the state illustrated in the seventh diagram from the top of FIG. 4. Then, the through-hole corresponding to the first through-hole 21 may be formed by crystal anisotropic etching, and thereafter, the oxide film 202 in the region of the lower surface of the single crystal silicon substrate 201 in the diagram corresponding to the piezoelectric element accommodation chamber 23 may be etched, and then the concave portion corresponding to the piezoelectric element accommodation chamber 23 may be formed by crystal anisotropic etching.

Next, a second through-hole forming step in step S30 of FIG. 5 is performed. Specifically, a through-hole corresponding to the second through-hole 22 is formed by MACE using an aqueous hydrogen fluoride solution in which hydrogen fluoride and hydrogen peroxide are mixed, as illustrated in a ninth diagram from the top of FIG. 4. Then, when the Au film 204 is etched, the sealing plate 20 of the present example is completed, as illustrated in a bottom diagram of FIG. 4. Note that, although the second through-hole forming step of step S30 is performed after the first through-hole forming step of step S20 is performed in the present example, the first through-hole forming step of step S20 may be performed after the second through-hole forming step of step S30 is performed by changing the content of the etching preparation step of step S10.

As described above, the method for manufacturing the sealing plate 20 of the present example as the method for manufacturing the single crystal silicon substrate includes the first through-hole forming step of step S20 for forming the first through-hole 21 including the inclined side wall 21*a* inclined with respect to the substrate surface, by performing crystal anisotropic etching on the first etching target region corresponding to the formation region of the first through-hole 21 of the first surface 20*a* of the substrate surface of the sealing plate 20 that is the single crystal silicon substrate. In addition, corresponding to the fourth and fifth diagrams from the top of FIG. 4, the etching preparation step of step S10 is provided for forming the Au film 204 that is the Au catalyst film in the second etching target region corresponding to the formation region of the second through-hole 22 of the second surface 20*b* of the substrate surface. Further, the second through-hole forming step of step S30 is provided for forming the second through-hole 22 including the side wall constituted by the vertical side wall 22*a* more nearly vertical to the second surface 20*b* than the inclined side wall 21*a* is, by etching the second etching target region corresponding to the formation region of the second through-hole 22 by bringing the single crystal silicon substrate 201 with the Au film 204 formed into contact with the hydrogen fluoride solution as an etching solution.

As described above, in the method for manufacturing the sealing plate 20 of the present example, the first etching target region is subjected to crystal anisotropic etching to form the first through-hole 21 including the inclined side wall 21*a*, and the second etching target region with the catalyst film formed is etched to form the second through-hole 22 including the side wall constituted by the vertical side wall 22*a*. By forming a through-hole by using a catalyst film as in MACE, it is possible to form a through-hole including a side wall more nearly vertical than when a through-hole is formed by crystal anisotropic etching. Therefore, the side wall of the second through-hole 22 can be constituted by the vertical side wall 22*a* substantially vertical to the substrate surface. Therefore, by performing the method for manufacturing the sealing plate 20 of the present example, it is possible to manufacture the sealing plate 20 having elaborate structure, and it is possible to manufacture the liquid discharge head 1 having a small size and a high resolution.

Here, in the first through-hole forming step of Step S20, a potassium hydroxide aqueous solution that is an alkaline aqueous solution is used as an etching solution, and in the second through-hole forming step of Step S30, the second through-hole 22 is formed by MACE. By manufacturing the sealing plate 20 in this manner, it is possible to manufacture the sealing plate 20 easily and with high accuracy. Note that, as the alkaline aqueous solution as the etching solution, for example, in addition to the potassium hydroxide aqueous solution used in the present example, a tetramethyl ammonium hydroxide (THAM) aqueous solution or the like can be suitably used, but no particular limitation is imposed thereon. The potassium hydroxide aqueous solution is inexpensive, and thus can be used, for example, for silicon substrate processing that does not involve a semiconductor. On the other hand, the THAM aqueous solution does not contain mobile ions such as Na and K, and thus can be used, for example, in crystal anisotropic etching processing for silicon substrate processing involving a semiconductor.

Note that, while forming the catalyst film in the etching preparation step of step S10, the method thereof is not particularly limited, but the catalyst film may be formed by an electroless plating method or a vapor deposition method. This is because the sealing plate 20 can be manufactured particularly easily and with high accuracy, by forming the catalyst film by the electroless plating method or the vapor deposition method to manufacture the sealing plate 20.

Figure 6:
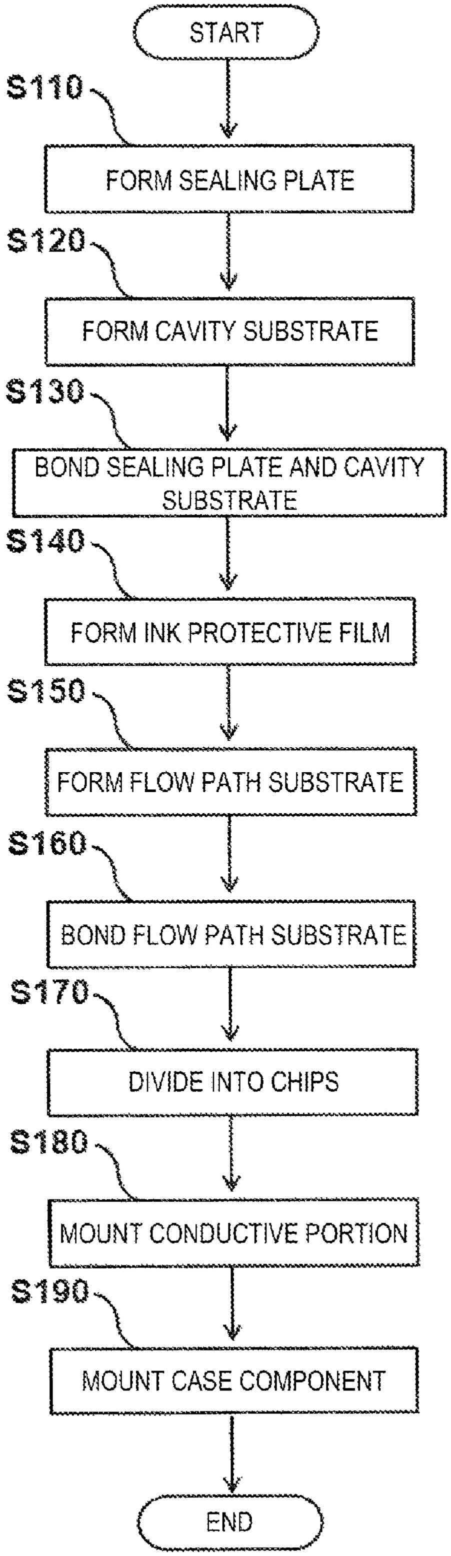
FIG. 6 is a flowchart illustrating a method for manufacturing the entire liquid discharge head of FIG. 1.

Next, a method for manufacturing the entire liquid discharge head 1 using the sealing plate 20 formed as described above will be described with reference to a flowchart of FIG. 6. First, in step S110, the sealing plate 20 is formed. The sealing plate 20 is formed as described above. Next, in step S120, the cavity substrate 30 is formed using an existing manufacturing method or the like, and in step S130, the sealing plate 20 and the cavity substrate 30 are bonded to each other. Note that, the order of steps S110 and S120 may be reversed, or may be performed simultaneously.

Thereafter, in step S140, an ink protective film made of titanium oxide (TiOx), hafnium oxide (HfOx), or the like is formed as film by a chemical vapor deposition (CVD) method or the like to form the ink protective film. In addition, although the flow path substrate 40 is formed using an existing manufacturing method or the like in step S150, step S150 may be performed before step S140. Then, in step S160, the flow path substrate 40 is bonded to the substrate in which the sealing plate 20 and the cavity substrate 30 are bonded. Then, in step S170, this is divided into chips by laser scribing or the like, and in step S180, the TCP constituting the conductive portion is COF-mounted. Finally, in step S190, a case component is mounted to complete the manufacture of the liquid discharge head 1. In such a method, since a chip of the liquid discharge head 1 can be assembled in a wafer state, quality can be stabilized, and mass production becomes easy.

Example 2

Figure 7:
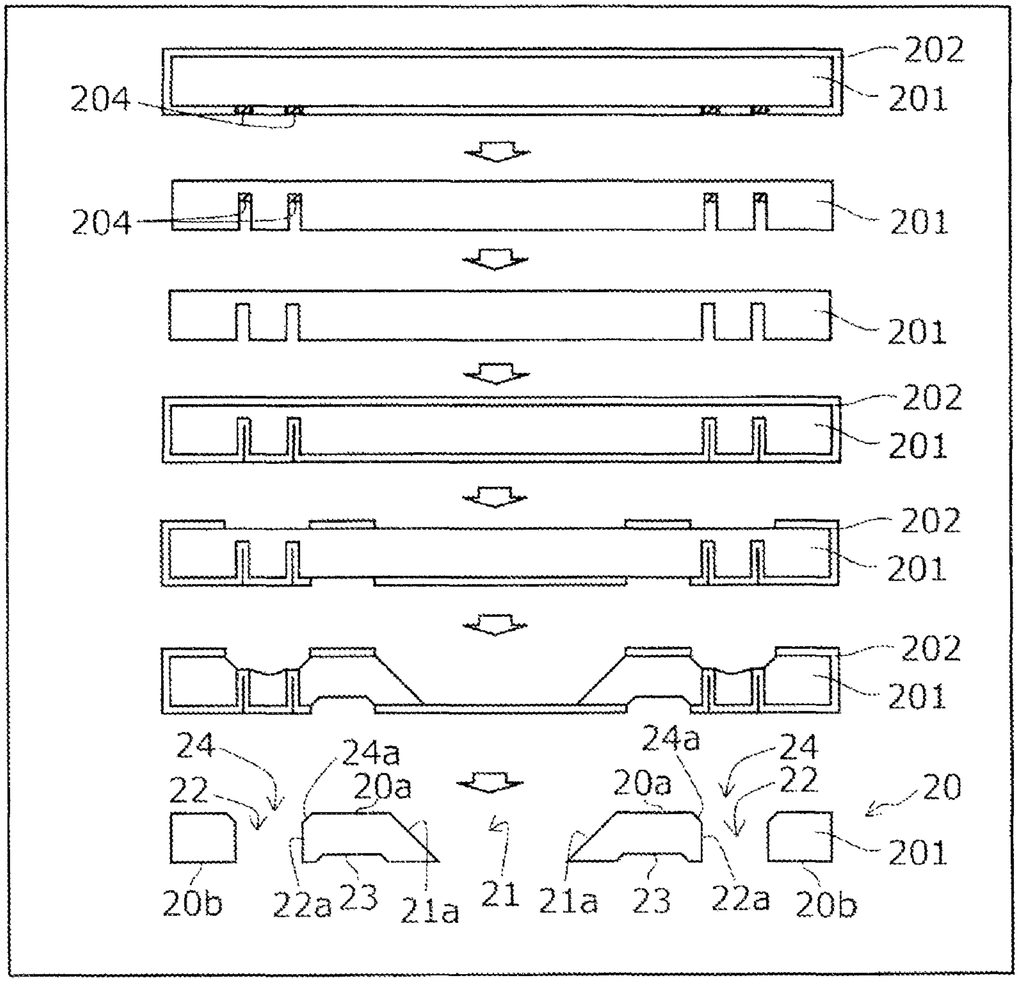
FIG. 7 is a diagram illustrating a manufacturing process of a sealing plate of a liquid discharge head of Example 2 of the present disclosure.

Hereinafter, a liquid discharge head of Example 2 will be described with reference to FIG. 7. FIG. 7 is a diagram corresponding to FIG. 4 in the liquid discharge head 1 of Example 1. The liquid discharge head of the present example is the same as the liquid discharge head 1 of Example 1 except for the configuration described below. Thus, the liquid discharge head of the present example has the same features as the liquid discharge head 1 of Example 1 except for the points described below. Therefore, in FIG. 7, the same reference numerals are used to denote the same constituent members as in example 1, and detailed description thereof will be omitted.

Figure 4:
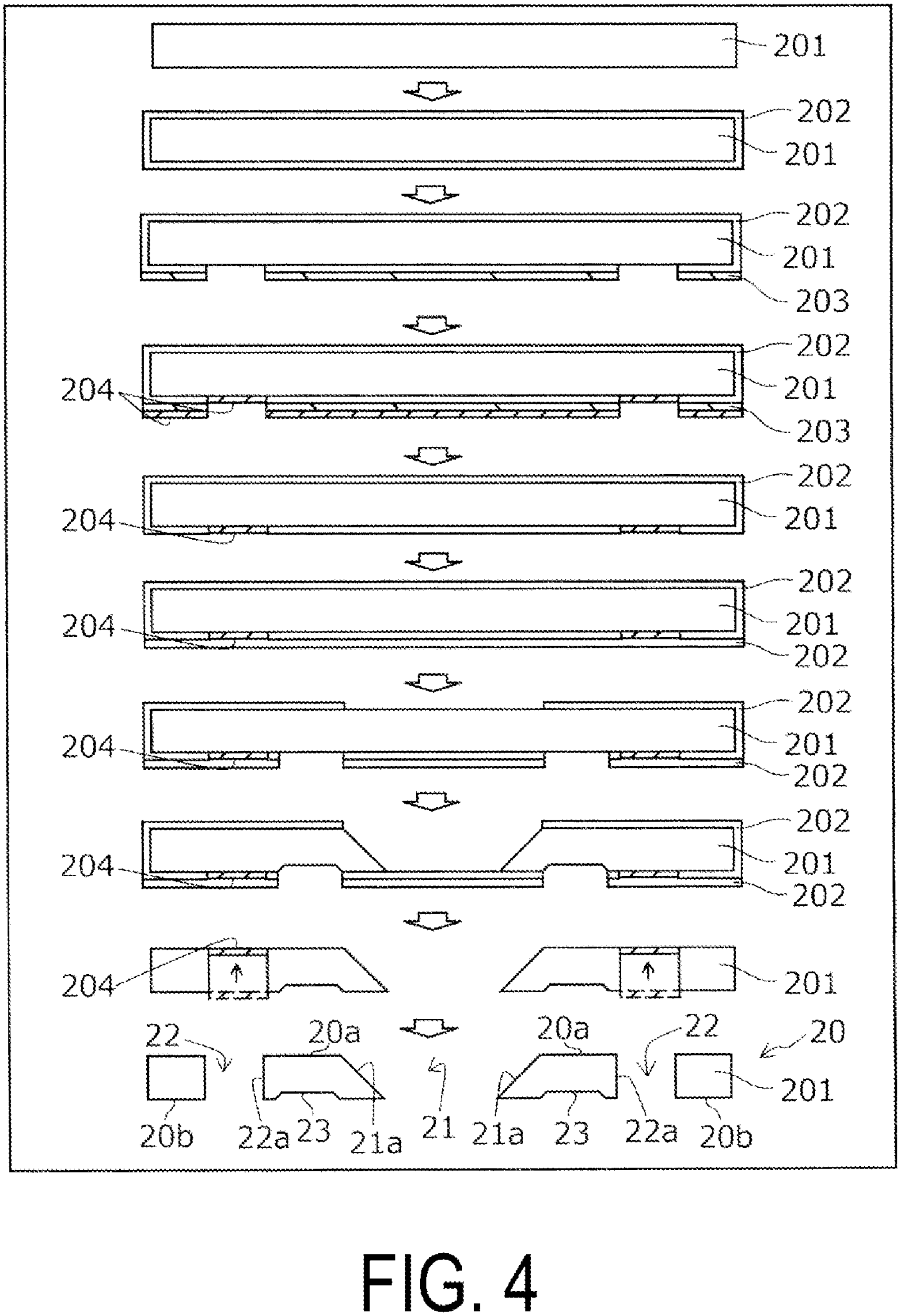
FIG. 4 is a diagram illustrating a manufacturing process of a sealing plate of the liquid discharge head of FIG. 1.
Figure 5:
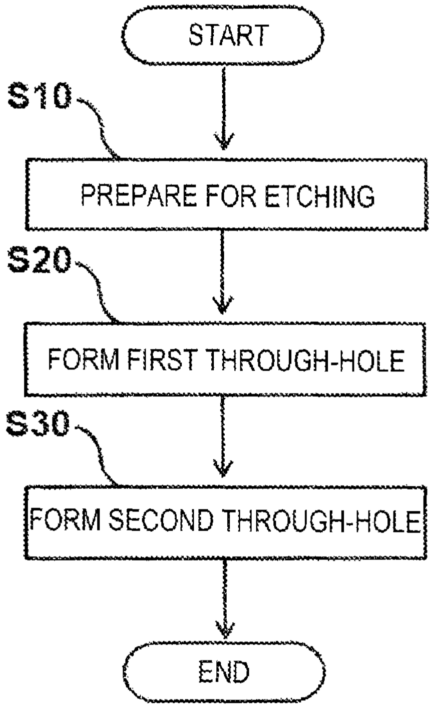
FIG. 5 is a flowchart illustrating a method for manufacturing the sealing plate of the liquid discharge head of FIG. 1.

Here, a top diagram of FIG. 7 corresponds to the fifth diagram from the top of FIG. 4. Steps of the present example corresponding to the diagrams from the top to the fourth of FIG. 4 are the same as those of Example 1, and are therefore omitted. However, in the present example, the Au film 204 has an annular shape when viewed from the lower surface. When MACE is performed from the state of the top diagram of FIG. 7 in the same manner as in the case of Example 1, a state of a second diagram from the top of FIG. 7 is obtained. The second diagram from the top of FIG. 7 illustrates a state in which a cylindrical hole is formed at the single crystal silicon substrate 201 by MACE. Thereafter, when the Au film 204 is etched, a state of a third diagram from the top of FIG. 7 is obtained.

Thereafter, when the oxide film 202 represented by $SiO_2$ is formed at the entire single crystal silicon substrate 201, a state illustrated in a fourth diagram from the top of FIG. 7 is obtained. Thereafter, patterning is performed with a resist by photolithography, and the resist is removed by etching to obtain a state illustrated in a fifth diagram from the top of FIG. 7. Here, the first surface 20*a* side corresponding to the second through-hole 22 is also brought into a state where the oxide film 202 is not formed. Thereafter, when crystal anisotropic etching of silicon (Si) forming the single crystal silicon substrate 201 is performed, a state of a sixth diagram from the top of FIG. 7 is obtained. Here, a concave portion is also formed on the first surface 20*a* side corresponding to the second through-hole 22. Then, when the oxide film 202 is finally removed, a state of a bottom diagram of FIG. 7 is obtained. Note that, in the above description, the etching by MACE is stopped by the oxide film 202, the first through-hole 21 and the second through-hole 22 are opened by the removal of the oxide film 202, and crystal anisotropic etching is stopped at the crystal plane of the single crystal silicon substrate 201 having the Miller indices (indices of crystal plane) of (111).

As illustrated in the bottom diagram of FIG. 7, in the sealing plate 20 of the present example formed in this manner, an opening portion 24 of the second through-hole 22 on the first surface 20*a* side widens toward the first surface 20*a*. In detail, the sealing plate 20 of the present example includes the first surface 20*a* and the second surface 20*b* as the substrate surfaces, and the first surface 20*a* is a surface on a side where the inclined side wall 21*a* is exposed. Then, the first through-hole 21 and the second through-hole 22 extend from the first surface 20*a* to the second surface 20*b*, and the opening portion 24 of the second through-hole 22 on the first surface 20*a* side is provided with an inclined surface 24*a* with respect to the first surface 20*a* that widens toward the first surface 20*a*. Since the sealing plate 20 of the present example has such a configuration, burrs or the like are prevented or restricted from remaining in the opening portion 24. In addition, with such an opening portion 24, for example, when liquid such as ink flows into the second through-hole 22 from the opening portion 24, the liquid can suitably flow. Note that, "the side on which the inclined side wall 21*a* is exposed" can also be expressed as "the side on which the inclined side wall 21*a* is visible when viewed from a direction perpendicular to the substrate surface".

In addition, when the sealing plate 20 of the present example is manufactured, a manufacturing flow is the same as that of FIG. 5, but in FIG. 5, in the second through-hole forming step of Step S30, the second through-hole 22 is caused to extend from the second surface 20*b* to the first surface 20*a*, and includes providing the opening portion 24 of the second through-hole 22 on the first surface 20*a* side with the inclined surface 24*a* with respect to the first surface 20*a* that widens toward the first surface 20*a*. By configuring the second through-hole forming step of the step S30 as such a step, it is possible to prevent or restrict burrs or the like from remaining in the opening portion 24. In addition, with such an opening portion 24, for example, when liquid flows into the second through-hole 22 from the opening portion 24, the liquid can suitably flow.

Example 3

Figure 8:
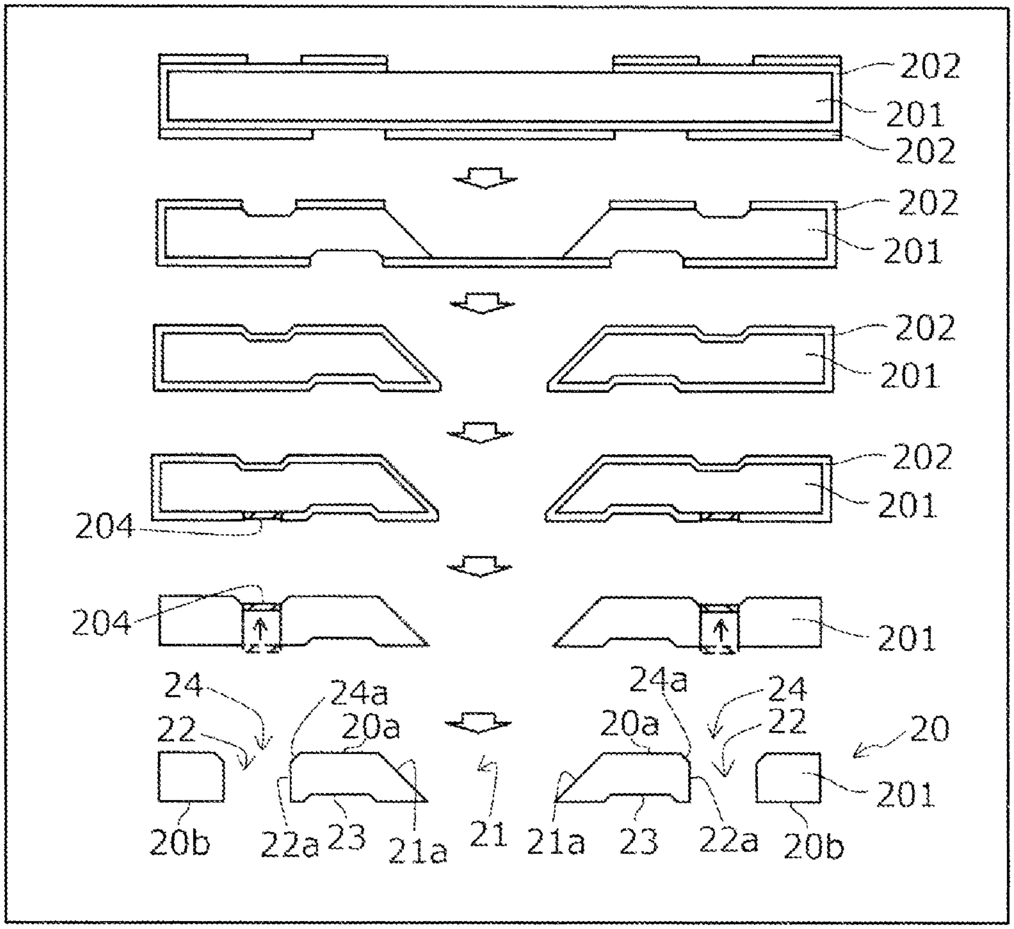
FIG. 8 is a diagram illustrating a manufacturing process of a sealing plate of a liquid discharge head of Example 3 of the present disclosure.

Hereinafter, a liquid discharge head of Example 3 will be described with reference to FIG. 8. FIG. 8 is a diagram corresponding to FIG. 4 in the liquid discharge head 1 of Example 1. The liquid discharge head of the present example is the same as the liquid discharge head 1 of Example 1 except for the configuration described below. Thus, the liquid discharge head of the present example has the same features as the liquid discharge head 1 of Example 1 except for the points described below. Therefore, in FIG. 8, the same reference numerals are used to denote the same constituent members as in Example 1, and detailed description thereof will be omitted.

A top diagram of FIG. 8 illustrates a state in which the oxide film 202 represented by $SiO_2$ is formed at the entire single crystal silicon substrate 201, patterning with a resist by photolithography and removal of the resist by etching are repeated, and the etching preparation step of step S10 of FIG. 5 is completed. A second diagram from the top of FIG. 8 illustrates a state in which the first through-hole forming step of step S20 of FIG. 5 is performed on the single crystal silicon substrate 201 in the state of the top diagram in FIG. 8. A third diagram from the top of FIG. 8 illustrates a state in which the oxide film 202 is further formed as film at the single crystal silicon substrate 201 in the state of the second diagram from the top of FIG. 8.

A fourth diagram from the top of FIG. 8 illustrates a state in which the single crystal silicon substrate 201 in the state of the third diagram from the top of FIG. 8 is patterned with a resist by photolithography, the resist is removed by etching, and the Au film 204 is formed as film by electroless plating. A fifth diagram from the top of FIG. 8 illustrates a state in which the second through-hole forming step of step S30 of FIG. 5 is performed on the single crystal silicon substrate 201 in the state of the fourth diagram from the top of FIG. 8. Then, a bottom diagram of FIG. 8 illustrates a state in which the Au film 204 is etched with respect to the single crystal silicon substrate 201 in the state of the fifth diagram from the top of FIG. 8. By forming the sealing plate 20 of the present example through the steps illustrated in FIG. 8, it is possible to manufacture the sealing plate 20 having the same shape as that of the sealing plate 20 of Example 2 formed through the steps illustrated in FIG. 7.

Example 4

Figure 9:
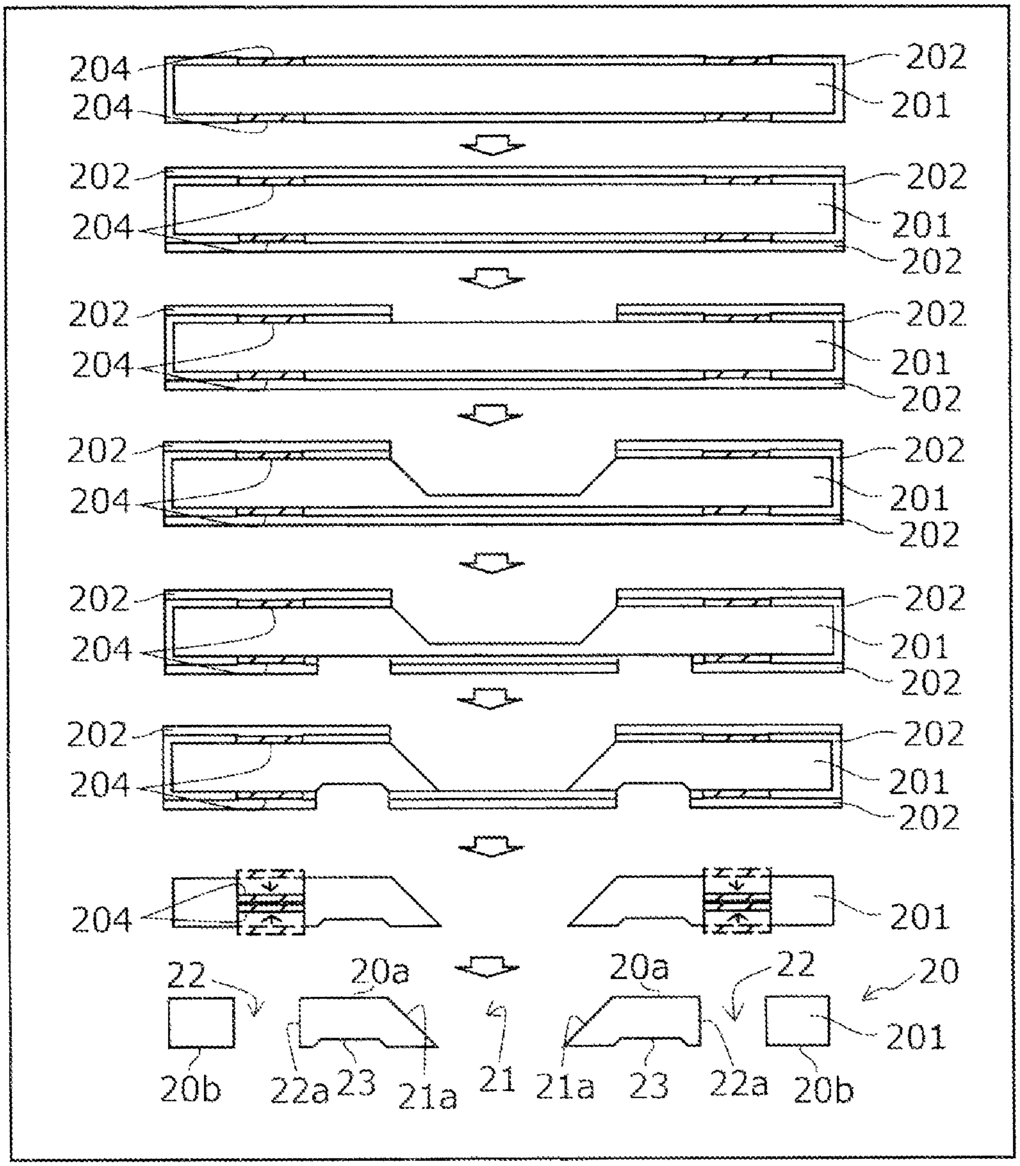
FIG. 9 is a diagram illustrating a manufacturing process of a sealing plate of a liquid discharge head of Example 4 of the present disclosure.

Hereinafter, a liquid discharge head of Example 4 will be described with reference to FIG. 9. FIG. 9 is a diagram corresponding to FIG. 4 in the liquid discharge head 1 of Example 1. The liquid discharge head of the present example is the same as the liquid discharge head 1 of Example 1 except for the configuration described below. Thus, the liquid discharge head of the present example has the same features as the liquid discharge head 1 of Example 1 except for the points described below. Therefore, in FIG. 9, the same reference numerals are used to denote the same constituent members as in Example 1, and detailed description thereof will be omitted.

The sealing plate 20 of Example 1 to Example 3 is formed by performing MACE only from the second surface 20*b* side in the second through-hole forming step of Step S30. The sealing plate 20 of the present example is formed by performing MACE not only from the second surface 20*b* side but also from the first surface 20*a* side in the second through-hole forming step of Step S30, and is the sealing plate 20 having the same shape as that of the sealing plate 20 of Example 1 formed through the stages illustrated in FIG. 4.

A top diagram of FIG. 9 illustrates a state in which the etching preparation step of step S10 of FIG. 5 is completed, that is a state in which the Au film 204 is formed not only on the second surface 20*b* side but also on the first surface 20*a* side in a region corresponding to the second through-hole 22, and the oxide film 202 represented by $SiO_2$ is formed as film at other regions. A second diagram from the top of FIG. 9 illustrates a state in which the oxide film 202 is further formed on each of both the first surface 20*a* side and the second surface 20*b* side of the single crystal silicon substrate 201 in the state of the top diagram of FIG. 9. A third diagram from the top of FIG. 9 illustrates a state in which the oxide film 202 in a region corresponding to the first through-hole 21 of the first surface 20*a* is removed, by performing patterning with a resist by photolithography, and removing the resist by etching, with respect to the single crystal silicon substrate 201 in the state of the second diagram from the top of FIG. 9.

A fourth diagram from the top of FIG. 9 illustrates a state in which the first through-hole forming step of step S20 of FIG. 5 is performed on the single crystal silicon substrate 201 in the state of the third diagram from the top of FIG. 9. A fifth diagram from the top of FIG. 9 illustrates a state in which the oxide film 202 in a region corresponding to the piezoelectric element accommodation chamber 23 of the second surface 20*b* is removed, by performing patterning with a resist by photolithography, and removing the resist by etching, with respect to the single crystal silicon substrate 201 in the state of the fourth diagram from the top of FIG. 9. A sixth diagram from the top of FIG. 9 illustrates a state in which etching of silicon is performed, and the first through-hole forming step of step S20 of FIG. 5 is further performed, on the single crystal silicon substrate 201 in the state of the fifth diagram from the top of FIG. 9. At this time, a region corresponding to the piezoelectric element accommodation chamber 23 is also etched.

A seventh diagram from the top of FIG. 9 illustrates a state in which etching of the oxide film 202 is performed, and then the second through-hole forming step of step S30 of FIG. 5 is performed, on the single crystal silicon substrate 201 in the state of the sixth diagram from the top of FIG. 9. Here, MACE is performed from upper and lower directions in the diagram. Then, a bottom diagram of FIG. 9 illustrates a state in which the Au film 204 is etched with respect to the single crystal silicon substrate 201 in the state of the seventh diagram from the top of FIG. 9. By forming the sealing plate 20 of the present example through the steps illustrated in FIG. 9, it is possible to manufacture the sealing plate 20 having the same shape as that of the sealing plate 20 of Example 1 formed through the steps illustrated in FIG. 4.

the present disclosure is not limited to the present examples described above, and can be realized in various configurations without departing from the gist of the present disclosure. For example, a single crystal silicon substrate such as the sealing plate 20 described above can be used in a micropump or the like, other than the liquid discharge head. Further, appropriate replacements or combinations may be made to the technical features in the present examples which correspond to the technical features in the aspects described in the SUMMARY section to solve some or all of the problems described above or to achieve some or all of the advantageous effects described above. Additionally, when the technical features are not described herein as essential technical features, such technical features may be deleted appropriately.

What is claimed is:

1. A liquid discharge head, comprising:

a single crystal silicon substrate that includes
- a substrate surface;
- a first through-hole including an inclined side wall which is inclined with respect to the substrate surface, wherein an angle formed by the inclined side wall with respect to the substrate surface is in a range from 45.0° to 54.7; and
- a second through-hole constituting a flow path and including a side wall, wherein
  - the side wall is constituted by a vertical side wall which is more vertical to the substrate surface than the inclined side wall is to the substrate surface,
  - the first through-hole is formed by crystal anisotropic etching,
  - the second through-hole is formed by metal-assisted chemical etching, and
  - the substrate surface includes
    - a first surface on a side where the inclined side wall is exposed, and
    - a second surface opposite to the first surface, wherein
      - the first through-hole and the second through-hole extend from the first surface to the second surface, and
      - an opening portion of the second through-hole on a first surface side is provided with an inclined surface with respect to the first surface, the inclined surface widening toward the first surface; and a cavity substrate including a third surface at which a piezoelectric element and a conductive portion electrically coupled to the piezoelectric element are formed, and a fourth surface at least a part of which constitutes the flow path and that is opposite to the third surface, wherein
- the third surface is bonded to the substrate surface with a part of the conductive portion exposed through the first through-hole, and the flow path of the fourth surface communicates with the second through-hole.

* * * * *